(12) United States Patent
Kanka

(10) Patent No.: US 7,919,039 B2
(45) Date of Patent: Apr. 5, 2011

(54) CERAMIC FIBER COMPOSITE MATERIAL

(75) Inventor: Bernhard Kanka, Bergisch Gladbach (DE)

(73) Assignee: Deutsches Zentrum fur Luft und Raumfahrt e.V., Cologne (DE)

( * ) Notice: Subject to any disclaimer, the term of this patent is extended or adjusted under 35 U.S.C. 154(b) by 572 days.

(21) Appl. No.: 11/451,946

(22) Filed: Jun. 13, 2006

(65) Prior Publication Data

US 2006/0280940 A1 Dec. 14, 2006

(30) Foreign Application Priority Data

Jun. 14, 2005 (DE) .................. 10 2005 027 560
Jun. 14, 2005 (DE) .................. 10 2005 027 561

(51) Int. Cl.
*B28B 1/52* (2006.01)
(52) U.S. Cl. .................................................. 264/640
(58) Field of Classification Search ............... 264/640, 264/641, 642
See application file for complete search history.

(56) References Cited

U.S. PATENT DOCUMENTS

| 5,053,364 | A | 10/1991 | Ray |
| 5,198,282 | A | 3/1993 | Baker et al. |
| 5,376,598 | A | 12/1994 | Preedy et al. |
| 6,083,861 | A | 7/2000 | Saruhan et al. |
| 6,472,059 | B2 | 10/2002 | Strasser et al. |
| 6,733,907 | B2 | 5/2004 | Morrison et al. |
| 2004/0132607 | A1 * | 7/2004 | Wood et al. .............. 501/95.1 |
| 2005/0003947 | A1 * | 1/2005 | Mazany et al. ............. 501/32 |
| 2006/0043651 | A1 * | 3/2006 | Yamamoto et al. ......... 264/661 |

FOREIGN PATENT DOCUMENTS

| DE | 19623425 A1 | 12/1997 |
| DE | 198 26 792 | 12/1999 |
| DE | 10 2004 049 406 | 4/2006 |
| EP | 0 260 867 | 3/1988 |
| WO | 9952838 A1 | 10/1999 |

OTHER PUBLICATIONS

Richerson, David W. Modern Ceramic Engineering. New York, Marcel Dekker, Inc, 1992. p. 379-381.*
R. Simon, P. Supancic; Proceedings of the 28$^{th}$ International Conference & Exposition on Advanced Ceramics & Composites; Jan. 2004; Verbundwerkstoffe, H-P Dregischer (editor); Wiley-VCH Publishers, Jul. 2003; pp. 298-303.
B. Hanka, H. Schneider; Aluminosillicate Fiber/ Mullite Matrix Composites with Favorable high-Temperature Properties; Journal of the European Ceramic Society; 2000; V. 20, p. 619-623.
H. Schneider; Innovative Processing and Synthesis of Ceramics, Glasses, and Composites IV; Ceramic Transactions, V. 115, p. 414-434.
M. Schmuecker; Temperature-Induced Fiber/Matrix Interactions in Porou Alumino Silicate Ceramic Matrix Composites; Journal of the European Ceramic Society; 2000 V. 20, p. 2491-2497.
Juegen Goering; A Potential Oxide/Oxide Ceramic Matrix Composite for Gas Turbine Applications; ASME Turbo Expo 2000; vol. 1, p. 620-624.

* cited by examiner

*Primary Examiner* — Matthew J Daniels
*Assistant Examiner* — Erin Snelting
(74) *Attorney, Agent, or Firm* — Harness, Dickey & Pierce, PLC

(57) ABSTRACT

The invention relates to a particularly low-cost and flexible process for the preparation of a sintered ceramic fiber composite material consisting of oxide-ceramic continuous fibers and an oxide-ceramic matrix, and to a fiber composite material prepared by such process.

11 Claims, 4 Drawing Sheets

100 μm

100 µm

100 µm

CERAMIC FIBER COMPOSITE MATERIAL

FIELD

The invention relates to a particularly low-cost and flexible process for the preparation of a sintered ceramic fiber composite material consisting of oxide-ceramic continuous fibers and an oxide-ceramic matrix, and to a fiber composite material prepared by such process.

BACKGROUND

In principle, oxide ceramics have a high application potential both as structural materials and for the thermal protection of combustion chambers and for hot-gas conducting components in airplane engines and stationary gas turbines. In such applications, temperatures of more than 1200° C. as well as thermomechanical stresses on the material occur from rapid temperature changes and local thermal loads.

Current oxide-ceramic fiber composite materials for engineering use under extreme thermal conditions, such as in gas turbines, either can be prepared only with a very high expenditure or, when the production expenditure is lower, have insufficient mechanical properties. The main problems involve the shrinking of the matrix during the drying and sintering process due to the low solids content in the slip employed.

Due to their brittleness, monolithic oxide ceramics are unsuitable for technical high-temperature use in safety-relevant cases. Therefore, since the 1990's, efforts have been made worldwide to develop oxide-ceramic materials which exhibit a damage-tolerant, i.e., quasiductile, behavior. One practicable possibility to prepare ceramic materials with sufficient "ductility" resides in the reinforcement by ceramic fibers, although the two components taken alone, i.e., the ceramic fiber and matrix, are inherently brittle.

Current oxide-ceramic fiber composite materials with sufficient mechanical properties for engineering use under extreme thermal conditions, such as the ceramic material WHIPOX® (wound highly porous oxide-ceramic matrix composite, DE 198 26 792 C2), are based on continuous oxide-ceramic fibers or cloths of the companies 3M (Nextel® 610 and Nextel® 720) or Nivity Company Ltd., Tokyo, Japan (R-960D). The high price of these aluminum silicate of aluminum oxide fibers highly determines the price of the ceramic composite prepared therefrom, since the volume proportion of the fibers is usually more than 30% by volume due to the preparation method.

Oxide-ceramic fiber composite materials which are mainly characterized by extreme thermoshock and thermofatigue resistance are being intensively developed and presented in various research facilities and companies. Such ceramics are preferably based on oxide-ceramic fiber cloths of the companies 3M® (Nextel® 610 and Nextel® 720), Nivity Company Ltd., Tokyo, Japan (R-960D), or Rath.

Sheet ceramic is an oxide fiber-reinforced oxide ceramic developed by the company Walter E. C. Pritzkow Spezialkeramik, Stuttgart, Germany. The fiber composite material consists of high-temperature resistant continuous fibers and matrices based on $Al_2O_3$, $SiO_2$ and mullite. The material belongs to the class of oxide-ceramics matrix composites, briefly OCMC. The preparation of the structural members is effected with laminating technologies similar to those used in the preparation of fiber-reinforced plastic materials. With appropriate molds, processes and installations, sheets, tubes and complex thin-walled lightweight structures can be prepared. This oxide-ceramic fiber composite material, which is utilized in relatively small numbers, for example, in furnace construction, in combustion technology, energy or casting technology, can be employed at temperatures of below 1200° C. on a long-term basis and at temperatures of up to 1700° C. only on a short-term basis in accordance with the manufacturer. The tensile and bending strengths are on a low level.

COI Ceramics, Inc. (San Diego, Calif., USA; http://www-.coiceramics.com) have developed an oxide-ceramic composite material mainly for use in commercial gas turbines. The preparation of the structural members is effected with laminating technologies similar to those used in the preparation of fiber-reinforced plastic materials, the final shaping of the green body being effected by vacuum technology. Thus, a fiber cloth is infiltrated with the slip and subsequently laid over a mold and dried on this mold in a vacuum step to form a green body, followed by sintering at about 1150° C. Based on aluminum silicate, this material reaches a tensile strength of up to about 365 MPa and an interlaminar shear strength of about 12 MPa for volume contents of the fibers of about 50% by volume. In this material, Nextel® 312, Nextel® 550, Nextel® 610 and Nextel® 720 fibers of 3M are employed.

The Materials Center Leoben presents (R. Simon, P. Supancic, Proceedings of the 28th International Conference & Exposition on Advanced Ceramics & Composites, Jan. 25-30, 2004, Cocoa Beach, Fla.; Verbundwerkstoffe, H.-P. Dregischer (Editor), Wiley-VCH Publishers, July 2003, pp. 298 to 303) the development and colloidal preparation of a novel oxide/oxide composite material. The preparation of the laminate is effected by infiltration of the ceramic cloths with the low-viscosity colloidal suspension having a low solids content in a classical wet-in-wet manual laminating method. The laminate is degassed and densified by means of the vacuum bag technique. The solidification of the laminate at room temperature takes from 24 to 48 hours. With a volume content of the fibers of 46 to 48%, a tensile strength of up to about 300 MPa and ILLS values for the interlaminar shear strength of about 14 MPa are achieved. The interlaminar shear strength can be measured according to DIN 65148 and is expressed by the quotient of the force resulting in a break failure within the shear surface to the shear surface.

For the preparation of oxidic CMCs, the Fraunhofer ISC (A. Rudinger, W. Glaubitt, 15. Symposium Verbundwerkstoffe und Werkstoffverbunde, Apr. 6-8, 2005, Universität Kassel) develops binder systems and filler powders based on a supramolecular organic precursor. By dip coating with a coating sol and subsequent thermal processing, an intermediate layer is applied to the fibers. The plastification of the binder systems at temperatures of from 100 to 140° C. enables post-densification of the CMC green bodies, which results in increased fiber contents of the CMCs within a range of about 30% by volume. The tensile strength of these ceramic composites is 152 MPa (0°/90°), their three-point bending strength is about 250 MPa, and their ILSS is 4 MPa.

DE 198 26 792 A1 describes a highly thermally resistant and oxidation-resistant fiber composite material made of oxide-ceramic fibers, and a method for the preparation thereof.

EP 02 60 867 A1 describes a furnace lining made of a fiber-containing ceramic material.

U.S. Pat. No. 6,472,059 B2 describes a sandwich-like composite of long fiber CMC (ceramic matrix composite) and short fiber CMC. In the process described, a polymer-derived green body is ceramized by pyrolysis. The bonding of the long and short fiber components is effected in the wet state.

U.S. Pat. No. 5,198,282 A and U.S. Pat. No. 5,376,598 A describe a ceramic insulation composite material. The long fiber component therein has a high density and may even be glass-like. The matrix contains whiskers, which are problematic for health reasons. The bonding of the long and short fiber components is effected in the wet state.

U.S. Pat. No. 6,733,907 D2 describes a composite of a ceramic support structure and ceramic heat insulation layer. The heat insulation layer has a higher temperature resistance than the long fiber reinforced support structure and protects the latter from too high thermal loads. A precondition of this concept is backside cooling and a sufficient heat transport by the support structure.

DE 10 2004 049 406 A2 describes a multilayer shaped article made of high-temperature resistant, chemically resistant and mechanically damage-tolerant ceramic materials, and a process for the preparation of the shaped article.

A disadvantage of the prior art is the high fiber content of the ceramic fiber composite materials of typically more than 30% by volume, which results from the usual preparation technology. On the one hand, it results from the particle size distribution of the oxide-ceramic powders employed (for example, aluminum silicate or aluminum oxide powder) which, in the form of a suspension, are infiltrated into the fiber cloths or individual continuous rovings (bundles of individual filaments). On the other hand, the fiber content is also highly affected by the dynamic viscosity of the suspension. However, sufficient amounts of small particles are necessary for a sufficient sintering activity in a temperature range which does not result in damage to (grain growth) the fibers. A high amount of small particles typically results in an increased viscosity. However, a low dynamic viscosity of the suspension is a basic precondition for a complete infiltration of the fiber bundles or fiber cloths. Due to the high fiber content, a contact between the fibers may occur, which results in a deterioration of the mechanical properties. However, if the solids content is too low in order to achieve a low dynamic viscosity of the slip, then an uncontrollably high volume proportion of the fibers occurs.

The preparation of previously known oxide-ceramic composites is effected by the infiltration of fiber cloths with a usually complex slip, which mostly contains elevated amounts of binders, requiring the burning of the green body. In addition, an expensive and time-intensive vacuum and drying technology is employed. Therefore, the resulting materials are very expensive because the production thereof often takes a few days (for example, COI Ceramics, Inc.), or because the starting materials employed are already extremely expensive (Materials Center Leoben, Austria).

However, when the ceramic composites can be prepared relatively easily, such as sheet ceramics (Walter E. C. Pritzkow Spezialkeramik, Stuttgart, Germany), the material characteristics, such as modulus of elasticity, tensile strength or bending strength, are within a range which excludes many fields of application.

SUMMARY

Thus, it is the object of the present invention to selectively adjust the fiber content by particular production parameters to thus meet the different demands in terms of material cost and properties. Another object of the present invention is to provide an oxide-ceramic matrix which exhibits a minimum shrinkage during drying and sintering and, as a composite with oxide-ceramic fibers, yields a material having excellent mechanical properties, but at the same time can be prepared simply and at low cost. A further object of the present invention is to be able to selectively adjust the fiber content especially low by particular production technologies in order to meet the different demands, mainly in terms of material cost, but also properties.

DETAILED DESCRIPTION

Figure 1:
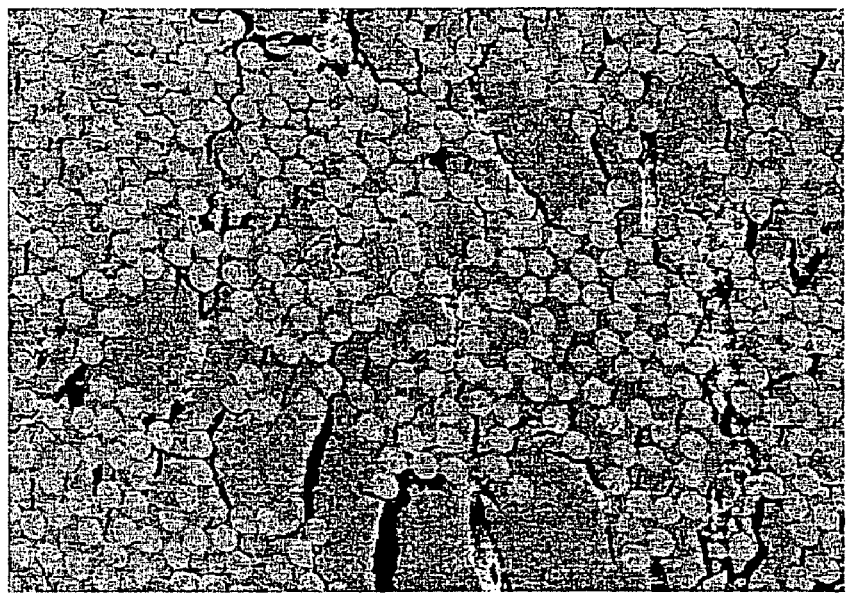
FIG. 1 is a scanning electron micrograph depicting a first particulate distribution.
Figure 2:
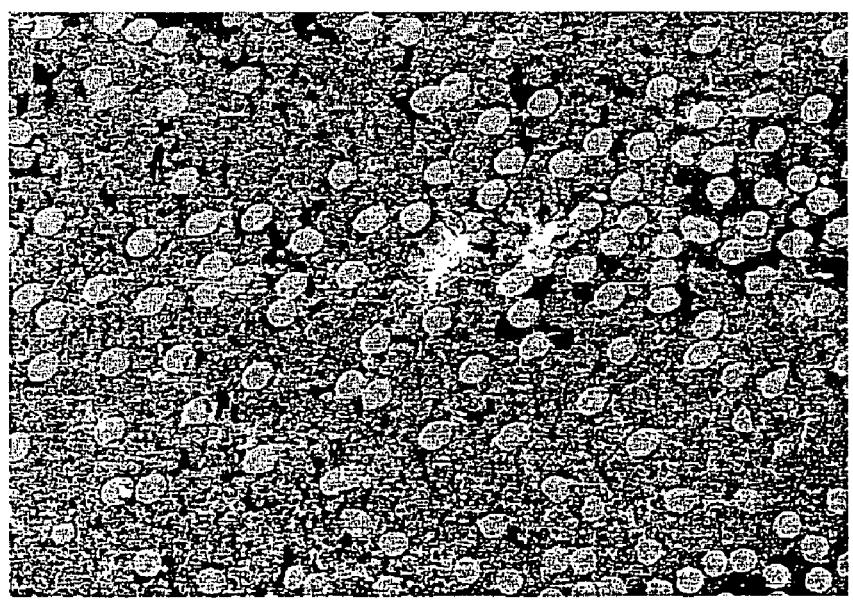
FIG. 2 is a scanning electron micrograph depicting a second particulate distribution.

In a first embodiment, the object of the invention is achieved by a process for the preparation of an oxide-ceramic fiber composite material, comprising the following steps:

a) calcinating an oxide-ceramic powder while retaining a free flowing property;

b) preparing a slip having a dynamic viscosity within a range of from 0.01 to 0.15 Pa·s, containing from 50 to 80% by weight of said oxide-ceramic powder, based on the total amount of the slip, from 0.1 to 25%, preferably to 3% by weight of a liquefier, based on the total amount of the slip, and water as the balance with mix-milling;

c) infiltrating oxide-ceramic continuous fibers with the slip;

d) forming a green body as a shaped article;

e) drying the green body; and f) sintering the green body to form the oxide-ceramic fiber composite material.

Continuous fibers within the meaning of the invention are fibers, spun filaments, rovings, strands, strings, non-wovens or cloths whose length is essentially limited by the dimensions of the shaped article prepared from the fiber composite material according to the invention.

Sintering within the meaning of the invention is a primary shaping process for shaped articles. It allows the preparation of finished parts and semifinished products without using a liquid phase. Thus, powder compositions are shaped with compacting at first in such a way that at least a minimum cohesion of the powder particles is provided. This so-called green body is subsequently densified by heat treatment below the melting temperature. The preparation of the green body is effected, for example, either by compressing powder compositions, slip casting or by a wrapping process. The sinter temperature within the meaning of the invention is that temperature at which the dried green body is converted to the fiber composite material as a final product.

The sintering process proceeds in three stages during which the porosity and the volume of the green body are significantly reduced. In a first stage, there is merely a densification of the green body, whereas in the second stage, the open porosity is clearly reduced. The strength of the sintered part is based on necks formed in the third stage by surface diffusion between the powder particles.

Calcination must be seen different from sintering. In calcination, ceramic powders are heated without melting or bonding at such a high temperature that volatile substances may be removed, or chemical changes caused. The powder is not compacted thereby. Usually, the skilled person would adjust the calcination temperature so low that the sintering activity of the ceramic powders remains sufficiently high. The calcination within the meaning of the invention is distinguished from the usual definition by the fact that a calcination temperature is chosen which is at least as high as the temperature at which necking can occur, and at most below the melting temperature, but with retention of the free-flowing property during calcination. Thus, during the calcination within the meaning of the invention, necking may occur, with the necks being destroyed in the subsequent milling. Therefore, the duration of the calcination process can be selected to avoid substantial necking. The subsequent milling in step b) destroys the necks at least partially. Active sites of the oxide-ceramic powder are formed thereby at the sites of fracture. Therefore, the time of calcination is preferably selected in a range of from 1 to 5 hours.

Drying within the meaning of the invention refers to the removal of water by the action of temperature, preferably within a range of from 40 to 100° C., advantageously over a period within a range of from 0.5 to 8 hours.

Surprisingly, it has been found that calcination of the oxide-ceramic powder at unusually high temperatures above the sintering temperature and preferably below the melting temperature produces an oxide-ceramic powder which may result in a slip which has a strikingly low dynamic viscosity with a remarkably high solids content. Therefore, the calcination temperature in the process according to the invention is advantageously between the sintering temperature and the melting temperature of the oxide-ceramic powder. Usually, calcination is performed at temperatures of a few hundred degrees below the sintering temperature in order that interconnection of the particles by necking is avoided. Thus, oxide-ceramic materials, such as aluminum oxides and hydroxides, are usually calcined at temperatures of up to 950° C. If the same aluminum-based oxide-ceramic powders are calcined at temperatures of preferably within a range of from 1200° C. to 1400° C., preferably to 1300° C., slips can be obtained which have an essentially lower dynamic viscosity for a high solids content.

An essential advantage of the process according to the invention over prior art processes is the fact that, in addition to a high strength of preferably more than 500 MPa for a one-dimensional fiber orientation (at a fiber content of at least 40% by volume) and preferably at least 200 and more preferably within a range of from 250 to 350 MPa for a two-dimensional fiber orientation (for example, fibers offset by 90° with respect to one another, where each fiber is measured at an angle of 45° from the direction of loading in the bending or tensile test) (at a fiber content of at least 30% by volume) in a three-point bending test, the extremely high damage tolerance (non-brittle fracture behavior) of the new fiber composite material is realized without coating the fibers. These strengths in a three-point bending test mainly relate to fiber composite materials containing the fiber Nextel® 610 of 3M. Bending specimens having a height of 3.6 mm, a width of about 10 mm and a testing length of 60 mm hold a bending stress of about 60% of the maximum bending stress after being bended by about 0.1 to 0.2 mm. When bended further, the bending stress decreases to only 25 to 30% of the maximum bending stress. In this connection, it is particularly remarkable that no visually detectable macroscopic shrinking cracks occurred when the process according to the invention was performed.

By selectively adjusting the dynamic viscosity of the slips (ceramic suspensions), the fiber content of the ceramic composites can be adjusted within a broad range. The dynamic viscosity can be changed by varying the solids content, the calcination temperature, type and amount of liquefier, milling time or by the addition of fillers.

The dynamic viscosity was measured by means of a Physica rotary viscometer Rheolab MC10® at a temperature of 21° C. in 3 min using the insert Z1 (DIN double gap) with a sample amount of 53 g of slip at a number of revolutions of 0.49 $s^{-1}$ and a shear rate of 146.8 $s^{-1}$.

Advantageously, the infiltrated fibers are surface-dried to form a green body before being densified, so that an influence can be immediately exerted on the dynamic viscosity of the suspensions. In the prior art, the dynamic viscosity can no longer be changed after the infiltration of the continuous fibers or fiber cloths.

Further, the dynamic viscosity can be varied through the solids content (50 to 80% by weight) of the suspension by calcinating the ceramic powders preferably in a temperature range of above 1150° C., especially up to 1400° C., and adding different amounts of liquefier. At any rate, the temperature is selected below the melting point.

By preparing an aqueous suspension, the slip, with a solids content of preferably more than 65% by weight, the shrinkage of the oxide-ceramic matrix can be minimized. A basic precondition is the calcination (thermal pretreatment) at temperatures preferably in a range of from 1150° C. to 1400° C., preferably to 1300° C. of the oxide-ceramic powders, especially aluminum oxide, aluminum hydroxide or aluminum silicate powder, which are subsequently milled with adding a liquefier in a way as to provide a high content of very fine particles (mean particle diameter at most 0.5 µm). After the infiltration of continuous oxide-ceramic fiber bundles (rovings) [for example, 3M (Nextel® 610 and/or Nextel® 720)], which may advantageously be processed further into a green body by a wrapping process or by the infiltration of fiber cloths and/or laminated, the drying of the green body is performed advantageously on a gypsum plate at a temperature of at least 50° C., followed by sintering, preferably in air at a temperature of at least 1100° C. An advantage over the prior art is the fact that in this way, i.e., despite of a low production expenditure, a material having excellent mechanical properties can be produced within a few hours without a later densification of extended holding time. It is worth mentioning that this route of preparation enables the use of inexpensive ceramic powders.

Thus, in the present invention, a high solids content of the slip (50 to 80% by weight) while the dynamic viscosity is low (less than 0.15 Pa·s) is important. In the prior art, a solids content of the slip of less than 50% by weight has been employed to date in the preparation of ceramic fiber composite materials.

The ceramic material of the continuous fibers and/or the oxide-ceramic powder may preferably and independently contain predominantly, especially consist of, $x_1$ $Al_2O_3 \cdot y_1$ $SiO_2$, where $x_1$ is a number within a range of from 1 to 5, and $y_1$ is a number within a range of from 0 to 4. Alternatively, the respective ceramic material may preferably also be $SiO_2$, MgO, AlO(OH), $Al_2O_3$, $ZrO_2$ and/or contain them as fillers and/or dopants. If the oxide-ceramic powder consists of AlO(OH), $Al_2O_3$ or mixed phases or mixtures thereof, it is preferably calcined at a temperature within a range of from 950 to 1350° C., especially within a range of from more than 1150 to 1350° C.

In the process according to the invention, the fiber content may be adjusted concretely to particular values. With respect to the finished fiber composite material, fibers in an amount of at least 25 and up to 50% by volume, preferably from 30 to 45% by volume and more preferably at most 40% by volume are advantageously employed in the process according to the invention. To date, an exact adjustment of the fiber content has not been possible, and the fiber content of previously known fiber composite materials varies from more than 40 to 50% by volume.

The continuous fibers according to the invention may advantageously be single filament fibers or rovings (fiber bundles). The continuous fibers preferably consist of silicates, aluminum oxides, aluminum hydroxides, mixed phases of these substances, or mixtures of these substances. As oxidation-resistant high alumina mullite fibers within the meaning of the present invention, fibers of the type Nextel® 610, 3000 denier, or Nextel® 720, 3000 denier, of the company 3M (U.S.A.) are more preferably employed. According to the invention, fibers having a fiber weight within a range of from 1500 to 10,000 deniers, for example, may be employed. As compared to other fiber grades, this aluminum silicate fiber has currently the best mechanical properties in the high temperature range in an oxidizing atmosphere. The tensile strength of the Nextel® 610, 3000 denier, fiber is about 3300 MPa for a testing length of 25 mm. Its modulus of elasticity is about 260 GPa. The continuous fibers as supplied by the manufacturer are advantageously drawn at first through a tubular furnace at a temperature within a range of from 900 to 1100° C. at a speed within a range of preferably 3 to 50 m/min in order to burn off the sizing (epoxy-like bonding of the roving for ensuring non-damaging processing of the fibers).

The soaking of the continuous fibers is advantageously effected with the above described slip, preferably on the basis of the oxide-ceramic powder having a BET surface area of up to 150 m$^2$/g, through a system of rolls.

The fibers, which are preferably surface-dried subsequently, are advantageously wound onto a cylinder provided in an air-conditioned chamber and covered by a release sheet.

For the preparation of tubes, the drying is effected directly on the cylinder. For preparing other geometric shapes, the fiber webs, while still wet, are advantageously cut in with a scalpel, removed from the cylinder, and the desired geometry is realized, after drying to completeness, by underlaying the corresponding shapes. Also, several thin layers may be stacked while still wet and bonded by pressing. Subsequently, the thus prepared green body is advantageously sintered in an air furnace or chamber kiln in a self-contained manner at a temperature of at least 1100° C. Thus, ceramic springs may also be prepared, for example. After drying to completeness, the green bodies and/or the sintered bodies are easily processed mechanically, for example, by drilling, grinding, milling or sawing with conventional tools.

The slip employed in the process according to the invention is preferably free from short fibers having a length of less than 2 cm. These short fibers, also referred to as whiskers, are harmful to health and thus limit the application of the fiber composite material according to the invention.

Advantageously, the oxide-ceramic powder is calcined at a temperature of at least 1250° C., especially at least 1300° C. This temperature treatment yields a powder by means of which a slip can be prepared which has a low dynamic viscosity despite of a high content of this oxide-ceramic powder (solids content).

Advantageously, a slip having a dynamic viscosity within a range of from 0.01 to 0.15 Pa·s, preferably from 0.02 to 0.1 Pa·s, more preferably from 0.02 to 0.05 Pa·s, is employed. Due to the low dynamic viscosity, it is ensured that the continuous fibers are infiltrated completely and uniformly. If a roving is employed as the continuous fiber, these low dynamic viscosities enable the slip to penetrate between the individual filaments, coat the individual filaments and thus keep them at a distance at least in part. This can also be observed visually by the swelling of the roving. By selectively adjusting the dynamic viscosity of the slip (ceramic suspension), the fiber content of the ceramic composites can be adjusted within a broad range. The dynamic viscosity can be changed, for example, by varying the solids content, the calcination temperature, type and amount of liquefier, milling time or by the addition of fillers.

Preferably, a slip having a solids content of at least 65% by weight, especially at least 75% by weight, is employed. Thus, a lower amount of volatile substances is removed during the preliminary drying, drying and/or sintering, and the shrinkage of the green body relative to the finished fiber composite material is extremely low as compared to the prior art. This shrinkage is advantageously less than 2% in every dimension of the green body. The maximum achievable solids content is determined by the size and the densest possible packing of the particles.

Preferably, a slip containing a liquefier in an amount of from 0.2 to 2% by weight, more preferably from 0.2 to 0.7% by weight, is employed. The amount of liquefier can be used to selectively adjust the dynamic viscosity and thus, due to the preparation process according to the invention, the fiber content of the fiber composite material. If the amount of liquefier is too high, a disadvantageous shrinkage of the fiber composite material is observed in an extreme case during the drying and/or sintering. Generally, too high a liquefier content results in a poor cohesion of the green bodies formed and a poor stability of the slip. However, if the liquefier content is too low, the dynamic viscosity is too high, and it is no longer possible with the slip to wet the filaments and/or fibers and/or rovings sufficiently uniformly and thus to selectively adjust the content of the fibers. The liquefier is advantageously based on carboxylic acids, especially those selected from the group consisting of Dolaflux® (Zschimmer & Schwarz GmbH & Co.), Dolapix® (Zschimmer & Schwarz GmbH & Co.), Tiron®, Peptapon®, Optapix® and Giessfix®.

Preferably, after mixing the ingredients of the slip, it is milled for a time within a range of from 5 to 60 minutes, especially using a planetary ball mill with $ZrO_2$ balls as a milling medium. The powders are intensively milled after the calcination. The milling of a calcined oxide-ceramic powder with a high content of $ZrO_2$ balls (diameter of 0.5 to 5 mm), preferably with an amount two to five times that of the remaining solids content, in such a way that the mean grain size, weighted according to volume proportions ($d_{50}$), is advantageously within a range of from 0.1 to 20 µm, especially within a range of from 0.2 to 0.5 µm, has been as yet unknown in the preparation of ceramic fiber composite materials. Thus, the agglomerates of the oxide-ceramic powder are broken up and then immediately coated by the liquefier. This has an influence on the zeta potential and thus the stability of the particles of the oxide-ceramic powder.

Figure 3:
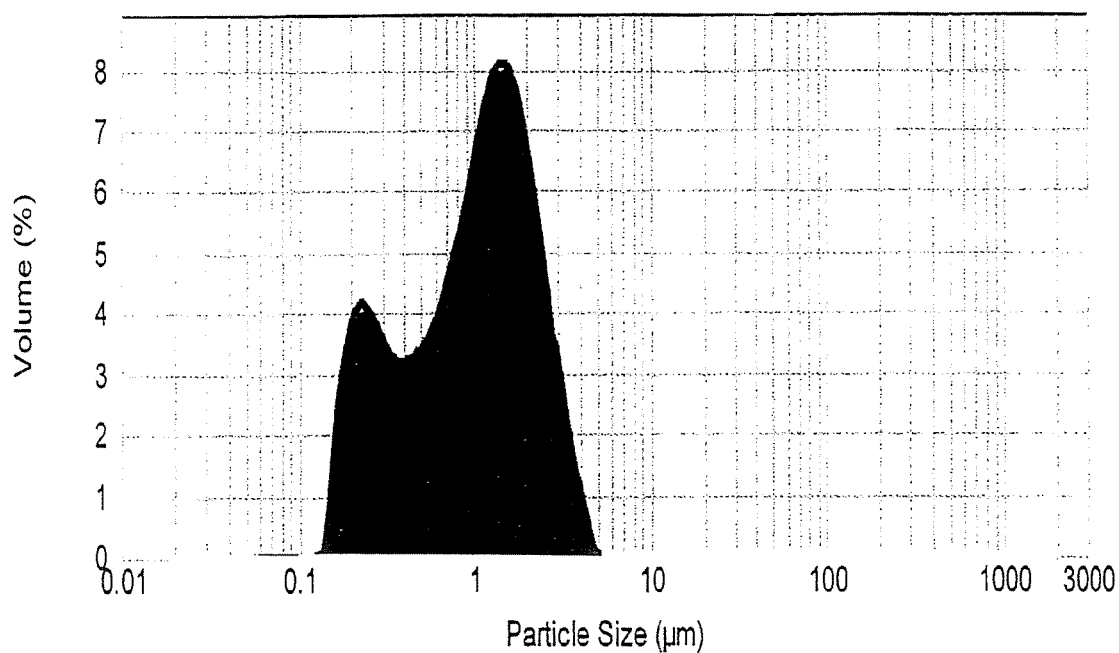
FIG. 3 is graph demonstrating the mean grain size weighted according to volume proportions of the particulates shown in FIG. 1.
Figure 4:
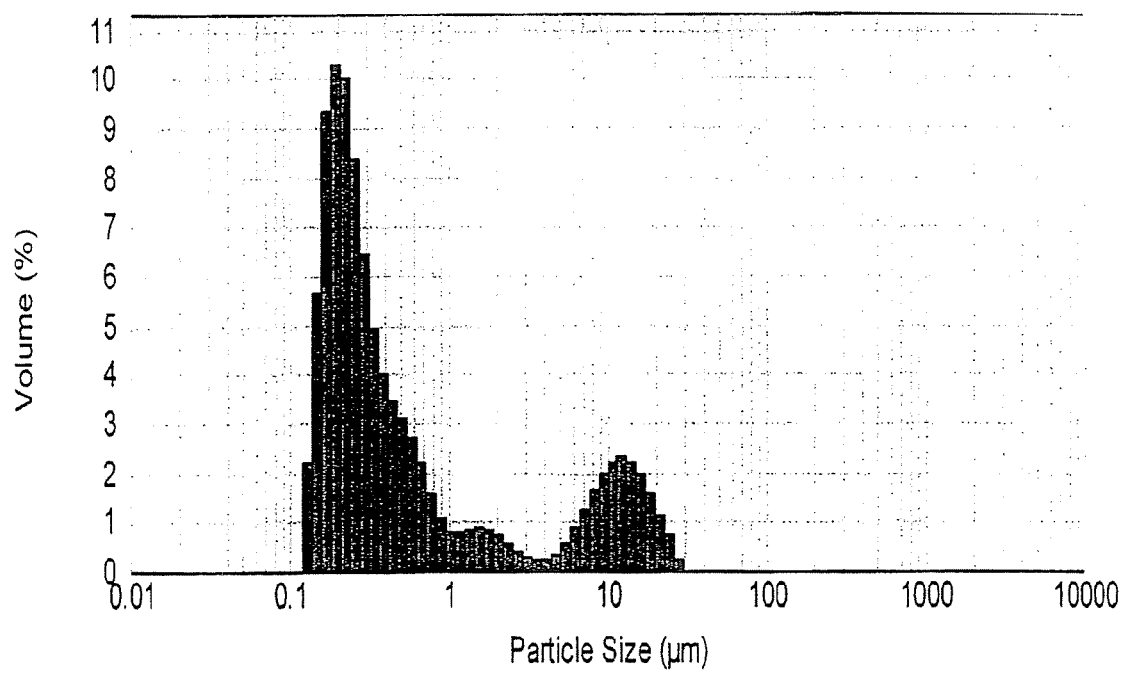
FIG. 4 is graph demonstrating the mean grain size weighted according to volume proportions of the particulates shown in FIG. 2.

The "mean grain size weighted according to volume proportions ($d_{50}$)" within the meaning of the invention means the mean grain size of the particles in the oxide-ceramic powder, where the mean value is not based on weight proportions of the particles, but on volume proportions of the particles. This relationship is illustrated in FIGS. 3 and 4.

Preferably, a binder-free slip is employed. A "binder" within the meaning of the invention is an organic substance which can keep the particles of the slip together. In particular, binders include those based on wax, polymers and especially resins. For the process according to the invention, it was established surprisingly and against the usual opinion that the slip can form a mechanically stable green body even without any binder. This has the critical advantage that the solids content of oxide-ceramic powder in the slip can be substantially higher, and thus a shrinkage during the drying and sintering can be substantially avoided.

It has been found particularly advantageous if the infiltrated continuous fibers are continuously wound. Thus, after having been infiltrated with the slip and optionally preliminarily dried, the continuous fibers are wound to form the green body, and the wound package is subsequently dried. The green body can subsequently be separated from the winding core, for example, by means of a scalpel. Thereby, a particularly uniform formation of the green body is realized which additionally allows a selective preliminary drying and thus provides a possibility to increase the solids content of the slip after the infiltration, but prior to the winding, and thus ultimately to selectively influence the fiber content of the green body formed.

Preferably, the infiltrated continuous fibers are subjected to continuous preliminary drying in a microwave oven before the green body is formed. Such continuous preliminary drying in a microwave oven causes a very rapid evaporation of the solvents, especially water since microwaves selectively excite water molecules. Thus, the preparation process is substantially speeded up as compared to the prior art, because in the prior art, the green bodies formed had to dry in air for a few hours. Thus, the preliminary drying in a continuously working microwave oven provided downstream causes water to evaporate and thereby immediately increases the solids content of the slip absorbed by the roving. Due to the resulting higher dynamic viscosity, a material having a controlled fiber volume content and homogeneous fiber distribution is built during the subsequent winding. In the previously known processes, after the infiltration of the fibers with the slip, it was no longer possible to influence the dynamic viscosity or the solids content of the slip on the fiber.

Figure 5:
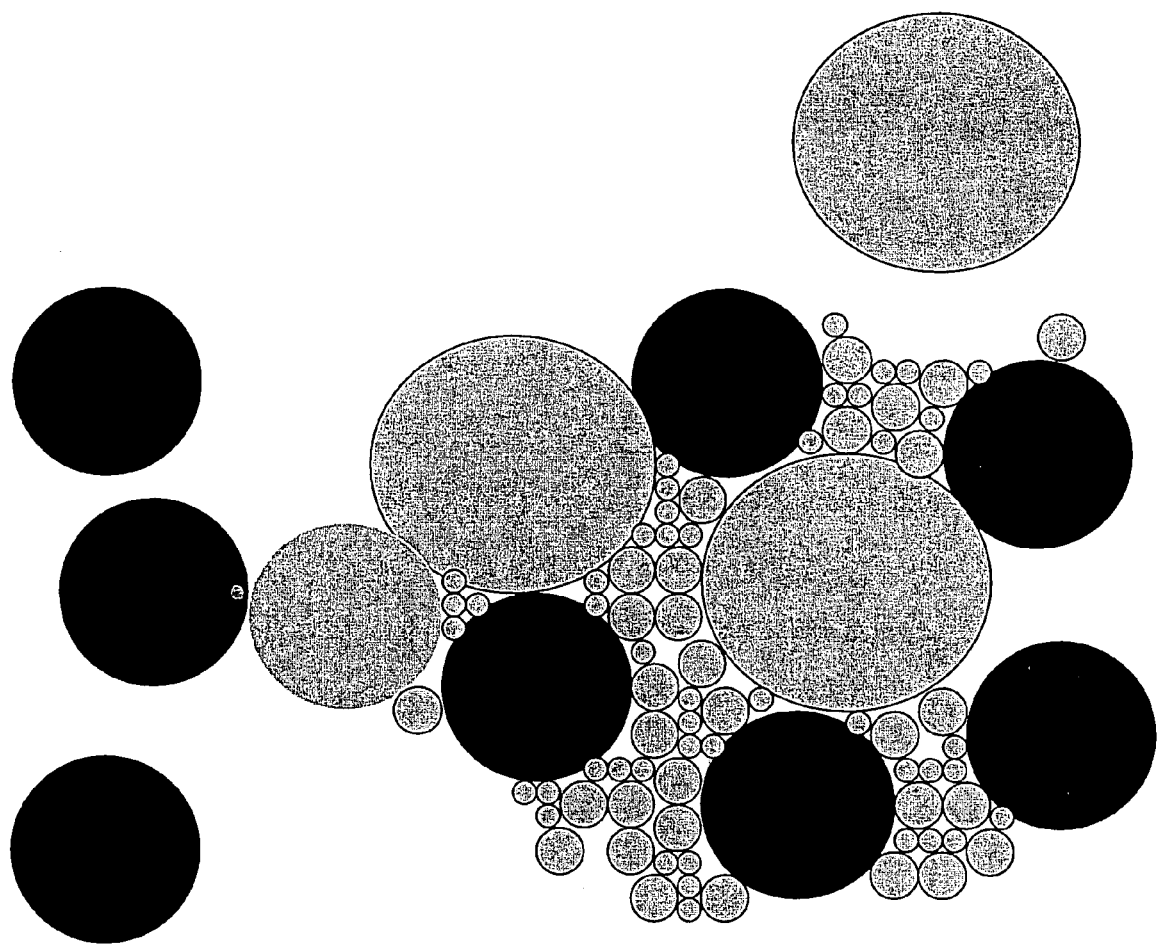
FIG. 5 is a schematic view illustrating different grain size fractions within the scope of the invention.
Figure 6:
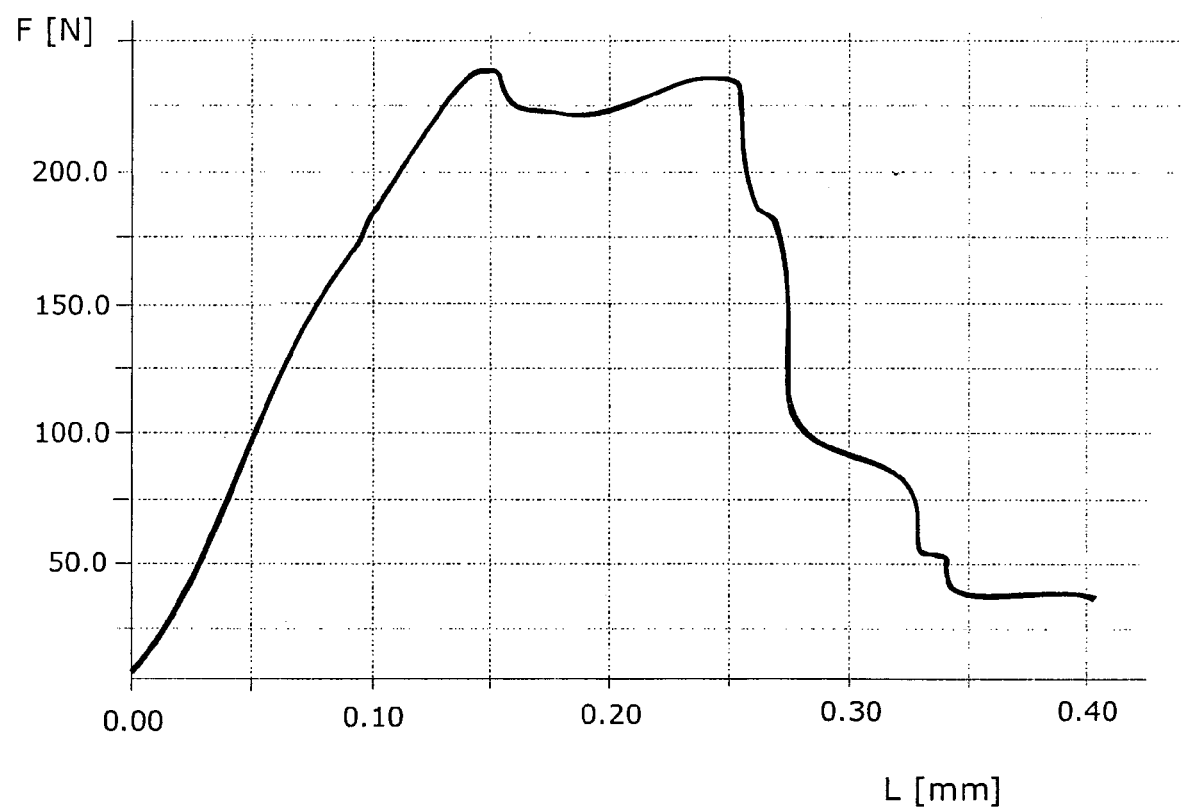
FIG. 6 is a stress-strain diagram.

Advantageously, an oxide-ceramic powder is employed which has different grain size fractions in the finished oxide-ceramic fiber composite material, wherein at least one of the grain size fractions has a mean grain size weighted according to volume proportions of up to 0.5 µm, and at least one other grain size fraction has a mean grain size weighted according to volume proportions of at least 5 µm. The larger grain fractions keep the fibers in the composite material at a distance and thus additionally control the fiber content. The smaller grain size fractions are indispensable for a complete and uniform sintering. In FIGS. 1 to 5, the influence of the particle distribution on the fiber volume content can be clearly seen. FIG. 3 shows the particle distribution with two peaks at about 0.2 µm and about 1.5 µm, which results in a fiber volume content of 35% (see scanning electron micrograph FIG. 1). In FIG. 4, a particle distribution with three peaks at about 0.2 µm, about 2 µm and about 12 µm can be seen, which results in a fiber volume content of 11% (see scanning electron micrograph FIG. 2). FIG. 5 schematically illustrates different grain size fractions as can be employed within the scope of the invention. The black circles indicate the fibers. The large grey circles indicate the particles having an average particle size diameter of about 1.5 µm. The small grey circles indicate the particles having an average particle size distribution of about 0.2 µm. FIG. 6 shows a damage-tolerant non-brittle fracture behavior typical of the invention in a load-deflection diagram.

In a further embodiment, the object of the invention is achieved by a process for the preparation of an oxide-ceramic fiber composite material comprising the following steps:

a) infiltrating oxide-ceramic continuous fibers with a slip containing a sinter-active oxide-ceramic powder having at least two different grain size fractions with different peaks in the grain size distribution, wherein at least one of the grain size fractions has a mean grain size weighted according to volume proportions of up to 1 µm, and at least one other grain size fraction has a mean grain size weighted according to volume proportions of at least 2 µm;

b) drying the green body obtained according to step a); and c) sintering the green body to form the oxide-ceramic fiber composite material.

By adjusting a bimodal or multimodal, or polymodal, particle size distribution, it is now possible to selectively adjust the fiber volume content within a range of from about 8% by volume to 50% by volume. On the one hand, a high proportion of very fine particles is present which ensure a sufficient sintering activity, and on the other hand, there is also a sufficient proportion of coarser particles which cause a higher interfiber distance and thus a lower fiber content. This results in advantages over the prior art with respect to material cost, density of the ceramic composites and production cost. Above all, an important difference from previously known fiber composite materials is the fact that usually oxide-ceramic powders having only a narrow particle size distribution have been employed.

An essential advantage of the process according to the invention over prior art processes is the fact that, in addition of a high strength of preferably more than 50 MPa in a three-point bending test, the extremely high damage tolerance (non-brittle fracture behavior) of the novel fiber composite material is realized without coating the fibers. This strength is preferably achieved with using the fiber Nextel® 720. Bending specimens having a height of 3.6 mm, a width of about 10 mm and a testing length of 60 mm hold a bending stress of about 60% of the maximum bending stress after being bended by about 0.1 to 0.2 mm. When bended further, the bending stress at first decreases to only at least 25% of the maximum bending stress. In this connection, it is particularly remarkable that no visually detectable macroscopic shrinking cracks occurred when the process according to the invention was performed.

The ceramic material of the continuous fibers and/or the oxide-ceramic powder may preferably and independently contain predominantly, especially consist of, $x_1$ $Al_2O_3 \cdot y_1$ $SiO_2$, where $x_1$ is a number within a range of from 1 to 5, and $y_1$ is a number within a range of from 0 to 4. Alternatively, the respective ceramic material may preferably also be $SiO_2$, MgO, AlO(OH), $Al_2O_3$, $ZrO_2$ and/or contain them as fillers and/or dopants. If the oxide-ceramic powder consists of AlO (OH), $Al_2O_3$ or mixed phases or mixtures thereof, it is preferably calcined at a temperature within a range of from 950 to 1350° C., especially within a range of from more than 1150 to 1350° C.

The grain size distribution according to the invention may advantageously be obtained by milling an oxide-ceramic powder in such a way that in addition to a "fine" mean grain size of up to 1 µm, a "coarse" fraction having a grain size proportion within a range of at least 2 µm is present.

Preferably, in the process according to the invention, sintered oxide-ceramic particles having different grain size fractions are employed, wherein at least one "fine" grain size fraction has a mean grain size weighted according to volume proportions of at least 0.1 µm, more preferably up to 0.5 µm, and at least one other, "coarse", grain size fraction has a mean grain size weighted according to volume proportions of at least 5 µm, more preferably at least 10 µm, even more preferably up to 20 µm. In the fiber composite material, the fractions are independently present in proportions of at least 10% by volume each, more preferably at least 20% by volume, wherein at least one "coarse" grain size fraction even more preferably has a lower volume fraction than a "fine" grain size fraction. By these conditions, on the one hand, the fibers can be kept at a sufficient mutual distance, and on the other hand, the composite material can have good mechanical properties due to efficient sintering. Further, sufficiently small particles for efficient sintering are also present.

Advantageously, the infiltrated fibers are subjected to preliminary drying before being densified to form the green body, whereby a direct influence on the dynamic viscosity of the suspensions can be exerted. In the prior art, the dynamic viscosity can no longer be changed after the infiltration of the continuous fibers or fiber cloths.

Advantageously, the ingredients of the slip are milled for a time within a range of from 1 to 60 minutes, preferably from 5 to 20 minutes, preferably using a planetary ball mill with $ZrO_2$ milling balls as a milling medium. The short duration of the milling ensures that a coarser grain size fraction remains within the powder. Advantageously, after the mixing of the slip ingredients, the slip is milled for a time within a range of from 5 to 10 minutes.

Preferably, $ZrO_2$ milling balls having a size within a range of from 0.5 to 5 mm are employed. If the size of the milling balls is below this range, the milling balls are difficult to separate from the oxide-ceramic powder. If the size of the milling balls is above this range, they fail to display the necessary milling action.

For the milling, preferably, a two to four times higher amount of $ZrO_2$ milling balls, especially an about three times higher amount of $ZrO_2$ milling balls, is employed. Thus, even for a short duration of the milling, a sufficient proportion of the oxide-ceramic powder is milled to a grain size sufficiently small for sintering.

Preferably, at least two of the grain size fractions of the oxide-ceramic powder are independently contained in an amount of at least 10% by volume, based on the solids content of the slip and/or the green body. Thus, the different fractions can serve their functions particularly well.

A slip having a solids content of at least 30% by weight, especially at least 65% by weight, is preferably employed. Thus, a lower amount of volatile substances is removed during the preliminary drying, drying and/or sintering, and the shrinkage of the green body relative to the finished fiber composite material is less as compared to the prior art. This shrinkage is advantageously less than 2% in every dimension of the green body. The maximum achievable solids content is determined by the size and the densest possible packing of the particles.

Preferably, a slip containing a liquefier in an amount of from 0.1 to 25% by weight, more preferably from 0.5, preferably 2 to 5% by weight, based on the total amount of the slip, is employed. The amount of liquefier can be used to selectively adjust the dynamic viscosity and thus, due to the preparation process according to the invention, the fiber content of the fiber composite material. If the amount of liquefier is too high, a disadvantageous shrinkage of the fiber composite material is observed in an extreme case during the drying and/or sintering. Generally, too high a liquefier content results in a poor cohesion of the green bodies formed and a poor stability of the slip. However, if the liquefier content is too low, the dynamic viscosity is too high, and it is no longer possible with the slip to wet the filaments and/or fibers and/or rovings sufficiently uniformly and thus to selectively adjust the content of the fibers. The liquefier is advantageously based on carboxylic acids, especially those selected from the group consisting of Dolaflux® (Zschimmer & Schwarz GmbH & Co.), Dolapix® (Zschimmer & Schwarz GmbH & Co.), Tiron®, Peptapon®, Optapix® and Giessfix®.

Preferably, the oxide-ceramic powder of the green body is calcined at a temperature above the sintering temperature, more preferably at a temperature of at least 950° C., even more preferably up to 1350° C., most preferably up to 1300° C., but at least below the melting point. This temperature treatment yields an oxide-ceramic powder by means of which a slip can be prepared which has a low dynamic viscosity despite of a high content of this oxide-ceramic powder (solids content).

In a further embodiment, the object of the invention is achieved by an oxide-ceramic fiber composite material obtainable by the process according to the invention. In addition to its sufficient mechanical stability and the possibility of simple and inexpensive preparation of complex parts, the shaped article has the advantage over the prior art that it has a low heat capacity, thermal conductivity and density, is damage-tolerant, is readily processed and has a high long-term stability in oxidizing atmosphere.

Preferably, the volume fiber content of the fiber composite material according to the invention is within a range of from 8, preferably 25 to 50% by volume, especially within a range of from 20, preferably 30 to 45% by volume, more preferably up to 40% by volume. Due to this fact and due to the high price of the continuous fibers, the fiber composite material according to the invention is significantly less expensive than the known composite materials. The previously known composite materials usually have a volume fiber content of more than 30 to 50% by volume.

Advantageously, the interlaminar shear strength is within a range of from 4 to 50 MPa, preferably 9 to 17 MPa, and/or the modulus of elasticity is within a range of from 20, preferably 70 to 200 GPa.

According to the present invention, a fiber composite material can be advantageously obtained which, on the one hand, has a particularly low volume fiber content, as mentioned above, and on the other hand, has the above mentioned excellent mechanical properties, depending on the amount of fibers.

The matrix porosity of the fiber composite material according to the invention is advantageously within a range of from 35 to 65% by volume or from 45 to 70% by volume. Thus, despite of good mechanical properties, the fiber composite material according to the invention has a very good heat insulation effect. The porosity was established by comparing the weighed shaped article with the weight obtained from the theoretical density of the materials employed, based on the same volume.

In the process according to the invention, the fiber content can be adjusted concretely to defined values. Advantageously, in the fiber composite material according to the invention, fibers are contained in an amount of at least 5 and up to 50% by volume, more preferably from 5 to 50% by volume, even more preferably at most 15% by volume. To date, an accurate adjustment of the fiber content has been impossible, and the fiber content of previously known fiber composite materials varied from more than 30 to 50% by volume. According to the invention, it has been surprisingly found that, despite of a selectively adjusted low fiber content, the fracture behavior was particularly damage-tolerant, as has been described above and will be further illustrated by means of the Example below. Due to this fact and due to the high price of the continuous fibers, the fiber composite material according to the invention is in addition significantly less expensive than the known composite materials. The previously known composite materials usually have a volume fiber content of more than 30 to 50% by volume.

Advantageously, the strength of the fiber composite material according to the invention in a three-point bending test is within a range of from 30 MPa to 200 MPa, especially within a range of from 40 MPa to 80 MPa, its interlaminar shear strength is within a range of from 2 to 13 MPa, and/or its modulus of elasticity is within a range of from 10 to 150 GPa.

According to the present invention, a fiber composite material can be advantageously obtained which, on the one hand, has a particularly low volume fiber content, as mentioned above, and on the other hand, has the above mentioned excellent mechanical properties, depending on the amount of fibers.

The matrix porosity of the fiber composite material according to the invention is advantageously within a range of from 40 to 80% by volume, especially from 70 to 80% by volume or from 45 to 70% by volume. Thus, despite of good mechanical properties, the fiber composite material according to the invention has a very good heat insulation effect. The porosity was established by comparing the weighed shaped article with the weight obtained from the theoretical density of the materials employed, based on the same volume.

The fiber composite materials according to the invention can be employed, for example, in combustion hearths (sintering aid), linings of high-temperature furnaces, thermal postcombustion plants and heat insulations.

EXAMPLE 1

For preparing the slip, the oxide-ceramic boehmite powder PURAL SB (manufactured by Sasol, Hamburg, Germany; specific surface area: 256 m$^2$/g; Al$_2$O$_3$ content: about 75% by weight) was first calcined at 1300° C. for 5 hours. Subsequently, 0.5 g of Dolapix® CE64 liquefier (manufactured by Zschimmer & Schwarz, Lahnstein, Germany; based on polycarboxylic acid) was added to 75 g of this calcined slip, and together with ZrO$_2$ balls and 24.5 g of water, the mixture was mixed and milled on a planetary ball mill (PM4000 of the company Retsch) for about 30 min.

The oxide-ceramic fiber (in the form of a roving, i.e., a bundle of individual filaments) Nextel® 610, 3000 denier, as supplied was first drawn through a tubular furnace at a temperature of 1100° C. to burn out the sizing (epoxy-like bonding of the roving). This was followed by infiltration of the continuous fibers in the above described slip by drawing the fiber through a channel containing the slip.

The rovings were wound onto a cylindrical core at a winding angle of 45°, passing through a continuously operated microwave for preliminary drying. The winding speed was 16 m/min. The green body, which was still slightly wet, was taken from the core after having been slit with a scalpel, placed on a gypsum plate and dried in a drying cabinet at about 60° C. for 4 hours. The subsequent sintering was effected in a chamber kiln in air of 1250° C. for 60 min.

This oxide-ceramic composite had a density of 2.8 g·cm$^{-3}$, a fiber volume content of 34% and a matrix porosity of 50%.

Its interlaminar shear strength was 13±4 MPa, its three-point bending strength was 310±20 MPa, and its modulus of elasticity was 87±8 GPa.

EXAMPLE 2

For preparing the slip, the oxide-ceramic boehmite powder PURAL SB (manufactured by Sasol, Hamburg, Germany; specific surface area: 256 m$^2$/g; Al$_2$O$_3$ content: about 75% by weight) was first calcined at 1200° C. for 5 hours. Subsequently, 2 g of Dolapix® CE64 liquefier (manufactured by Zschimmer & Schwarz, Lahnstein, Germany; based on polycarboxylic acid) was added to 65 g of this calcined oxide-ceramic powder, and together with 180 g of ZrO$_2$ balls having an average diameter of 1 mm and 33 g of water, the mixture was mixed and milled on a planetary ball mill (PM4000 of the company Retsch) for about 10 min. The dynamic viscosity of the slip was 0.091 Pa·s.

The oxide-ceramic fiber (in the form of a roving, i.e., a bundle of individual filaments) Nextel® 720, 3000 denier, as supplied was first drawn through a tubular furnace at a temperature of 1100° C. to burn out the sizing (epoxy-like bonding of the roving). This was followed by infiltration of the continuous fibers in the above described slip by drawing the fiber through a channel containing the slip.

The rovings were subjected to surface drying in a continuously working microwave oven, during which about 20% by weight of the water evaporated, which resulted in an increase of dynamic viscosity to a value above 0.1 Pa·s. With an average speed of 16 m/min, the rovings were wound onto a cylindrical core covered by a release sheet. The green body, which was still slightly wet, was taken from the core after having been slit with a scalpel, placed on a gypsum plate and dried in a drying cabinet at about 60° C. for 4 hours. The subsequent sintering was effected in a chamber kiln in air of 1350° C. for 60 min.

This oxide-ceramic composite had a density of 2.44 g·cm$^{-3}$, a fiber volume content of 11% and a matrix porosity of 72%.

Its interlaminar shear strength (ILLS) was 4.9 MPa, its three-point bending strength was 60 MPa, and its modulus of elasticity was 21 GPa.

The fracture behavior is illustrated in the load-deflection diagram in FIG. 6. It is clearly seen that, despite of the low fiber content, after a first fracture at a deflection of about 0.15 mm and a breaking load of about 247 N, the load was first kept at about the same level by the fiber composite material according to the invention in a damage-tolerant manner. Only after a second fracture at a deflection of about 0.25 mm and a breaking stress of about 245 N, the fiber composite material yielded slightly. The load dropped to about 180 N at first. Now, the fiber composite material fractured in several steps until it finally broke at a deflection of about 0.35 mm.

The invention claimed is:

1. A process for the preparation of an oxide-ceramic fiber composite material comprising the steps of:
   a) infiltrating oxide-ceramic continuous fibers with a binder-free slip to a defined fiber content value, said binder-free slip containing a sinter-active oxide-ceramic powder having at least 10% of both a first and second grain size fraction with different peaks in the grain size distribution, wherein said first grain size fraction has a mean grain size weighted according to volume proportions of up to 1 μm, and said second grain size fraction has a mean grain size weighted according to volume proportions of at least 2 μm;
   b) drying a green body obtained according to step a); and
   c) sintering the green body to form the oxide-ceramic fiber composite material with a volume fiber content within a range of from about 5 to 15% by volume.

2. The process according to claim 1, wherein said first grain size fraction has a mean grain size of up to 0.5 μm.

3. The process according to claim 1, wherein said second grain size fraction has a mean grain size weighted according to volume proportions of at least 10 μm.

4. The process according to claim 1, wherein a slip having a solids content of 65% to 80% by weight, is employed.

5. A process for the preparation of an oxide-ceramic fiber composite material, comprising the steps of:
   a) calcinating an oxide-ceramic powder at a temperature of at least 1250° C. while retaining a free flowing property;
   b) preparing a binder-free slip having at least 10% by weight of both a first and second grain size fraction of sinter-active oxide-ceramic powders, a dynamic viscosity within a range of from 0.01 to 0.15 Pa·s, containing at least 65% by weight of said oxide-ceramic powder, based on the total amount of the slip, from 0.1 to 25% by weight of a liquefier, based on the total amount of the slip, and water as the balance with mix-milling;
   c) infiltrating oxide-ceramic continuous fibers with the binder-free slip to a defined fiber content value;
   d) forming a green body as a shaped article;
   e) drying the green body; and
   f) sintering the green body to form the oxide-ceramic fiber composite material with a volume fiber content within a range of from about 5 to 15% by volume,
   wherein the first grain size fraction is a fine grain size fraction with a mean grain size weighted according to volume proportions of from 0.1 to 0.5 μm and the second grain size fraction is a coarse grain size fraction with a mean grain size weighted according to volume proportions of from 5 μm to 20 μm.

6. The process according to claim 1, wherein a slip having a dynamic viscosity within a range of from 0.02 to 0.1 Pa·s, is employed.

7. The process according to claim 1, wherein said second grain size fraction has a lower volume fraction in said oxide-ceramic fiber composite material than said first grain size fraction.

8. The process according to claim 1, wherein a slip containing a liquefier in an amount of from 0.2 to 5% by weight, is employed.

9. The process according to claim 1, wherein the infiltrated continuous fibers are subjected to preliminary drying in a microwave oven before the green body is formed.

10. The process according to claim 1, wherein a slip having a solids content of at least 75% by weight is employed.

11. The process according to claim 1, wherein a slip containing a liquefier in an amount of from 0.2 to 0.7% by weight is employed.

* * * * *